April 4, 1939. J. P. BUCKLEY 2,153,412
AUTOMATIC MONITOR FOR MACHINE CONTROLS
Filed Dec. 17, 1937 3 Sheets-Sheet 2

Inventor
John P. Buckley

April 4, 1939.  J. P. BUCKLEY  2,153,412

AUTOMATIC MONITOR FOR MACHINE CONTROLS

Filed Dec. 17, 1937  3 Sheets-Sheet 3

John P. Buckley, Inventor

Patented Apr. 4, 1939

2,153,412

UNITED STATES PATENT OFFICE 2,153,412

AUTOMATIC MONITOR FOR MACHINE CONTROLS

John P. Buckley, Washington, D. C.

Application December 17, 1937, Serial No. 180,432

24 Claims. (Cl. 35—48)

There are many thousand different kinds of machines in commercial practice which require skillful operators to control. The machines, notwithstanding the care exercised in their design, must necessarily depend upon the human endeavor for producing the final effect. In this age of "bustle" and "hurry" it is but natural that the human, at best, should fall into error, and errors are sometimes disconcerting and costly.

There should be an effort between the machine and the operator's movement, whereby errors would be entirely abolished. The machine having a definite prearranged movement, should also be met by the operator having a definite prearranged motion, so that no error may occur in producing the final result.

To this end I have devised an automatic monitor for machine controls. To mention one example: and as one of the objects of the invention, the apparatus, when cooperating with a typewriter, charged with a perforated lesson sheet, similar in some respects to a piano roll in design, and a printed lesson sheet having a synchronized movement with the perforated lesson sheet, becomes an automatic silent teacher for school work in general. Reference is made to U. S. Patent No. 2,060,974, Educational device, issued to applicant, November 17, 1936, Still another object of the invention is to provide a specially designed lesson sheet for the typewriter of printed "questions" and "answers", wherein the "answers" are shielded by a screen attached to the typewriter, but are made available to the pupil when he is not certain of the correct answer.

Another object of the invention is to provide means for automatically scoring all errors of the pupil, as they are made in the course of the lesson.

Another object of the invention is to provide an endless film or lesson sheet, partly surrounding the platen, whereon one or more lessons are carried representing a day's work.

Another object of the invention is to provide means whereby the pupil may not turn the platen in reverse to crib the answer, without calling the attending monitor to unlock the platen, and thereafter to readjust the whole.

Another object of the invention is to score all errors of the pupil on a printed lesson sheet partially surrounding the platen wherein the error-record electromagnet is positioned to coordinate with the screen member in serving to drive the inked pad against the lesson sheet, thereby making a mark on the paper, as you would do, similarly, in pulling the handle downward to read the shielded answer.

Figure 1:
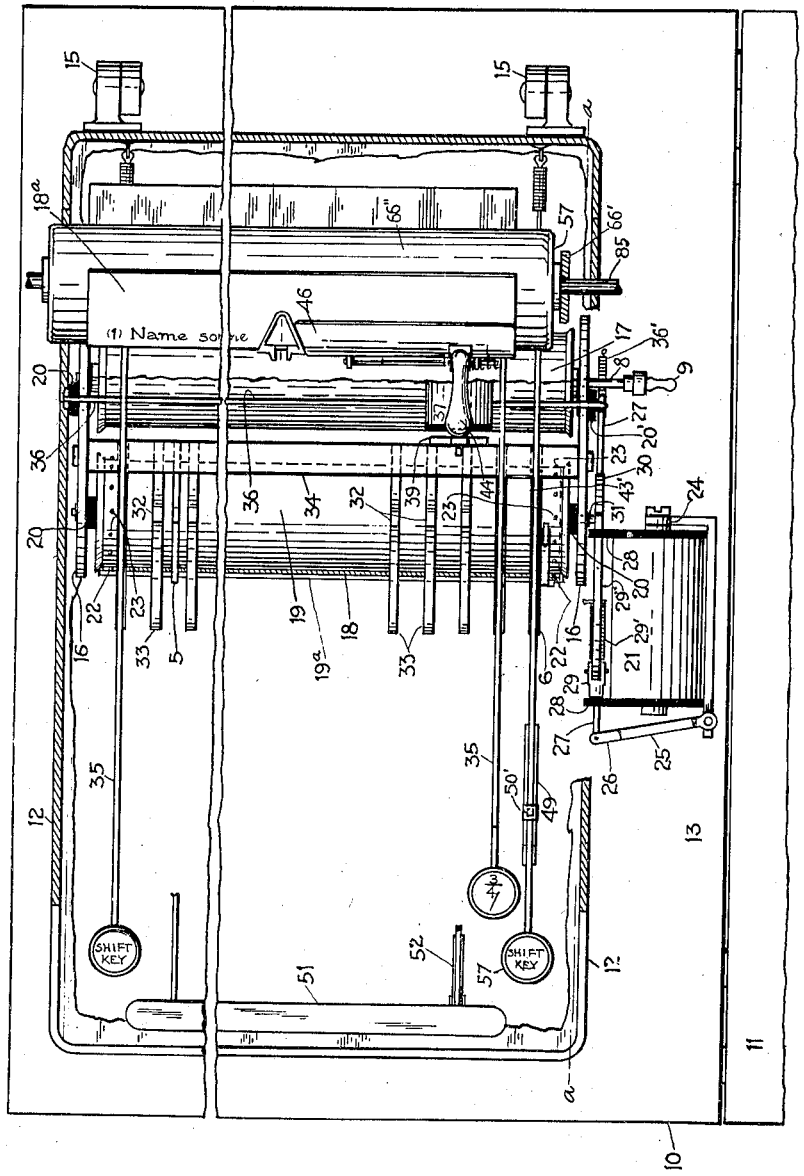
Fig. 1 is a top view of the apparatus.

The numeral 10 designates the table top, having the hinged portion 11, which may serve as a small desk when the typewriter 12 is not in use. The bed plate 13 has the four studs 14 upon which the typewriter rests. The rear lower portion of the frame is hinged as at 15 for the purpose of enabling the typewriter to be swung backward as in charging or releasing a spool in the monitor 15' below the typewriter.

The shaft 8, carrying the handle 9, extends from the spool 17, although any other kind of power, other than hand motion, may apply when properly connected with the shaft. The spool, when charged, is surrounded by the perforated lesson sheet 18, the forward end of which extends over and partly surrounds the metallic contact drum 19, which is insulated and journalled in the two metallic sides 16 by the insulation bushings 20. 19a is a slot in the bed plate 13 through which the perforated lesson sheet may pass.

The step-up electromagnet 21, when energized, is designed to impart a step-by-step motion to the metallic contact drum. In order to impart a like movement to the perforated lesson sheet carried thereon, I have provided small pins 23, spaced apart around the diameter of the drum, adjacent to its ends, to engage the holes 22 in the two outer edges of the sheet. In this way the sheet movement is made positive and to coincide with the movement of the printed lesson sheet 18a in the typewriter.

Figure 2:
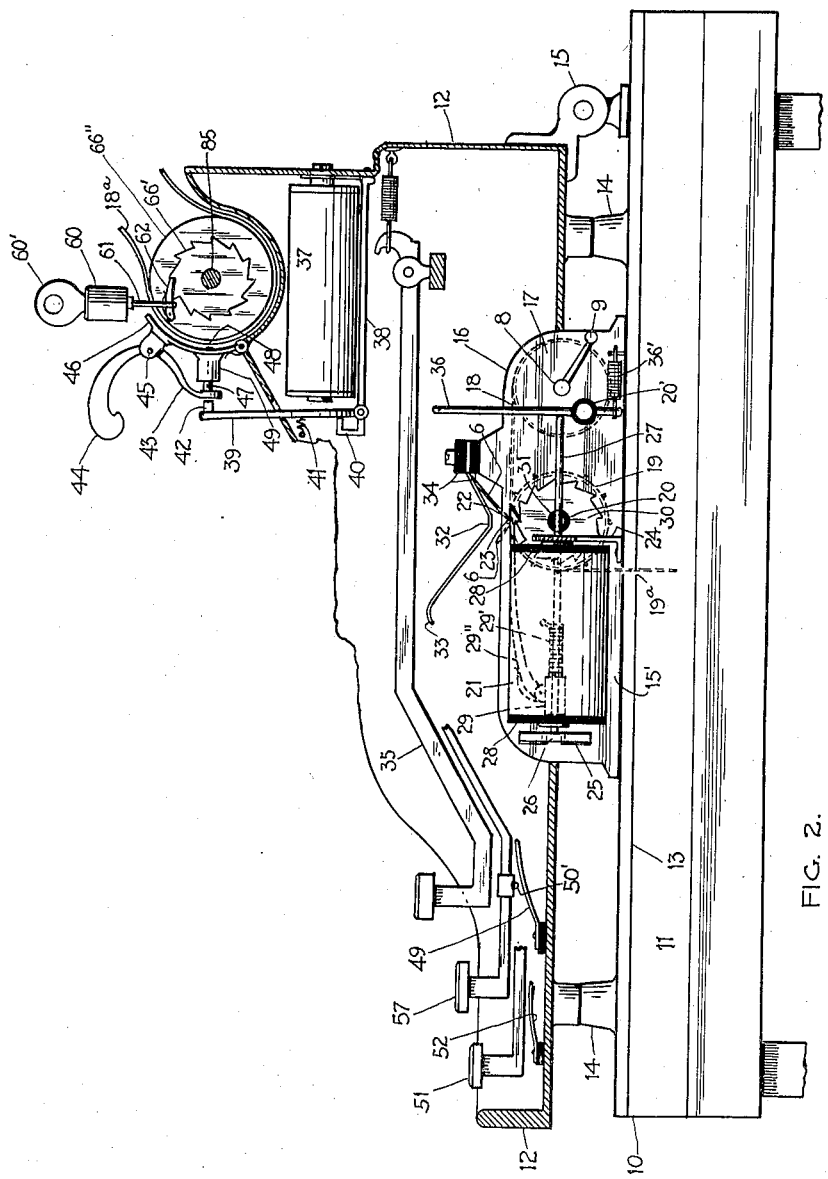
Fig. 2 is a side elevation view in section, a—a, showing the step-up electromagnet associated with the movement of the metallic contact drum and the error recording electromagnet associated with the screen mechanism for marking the printed lesson sheet.
Figure 3:
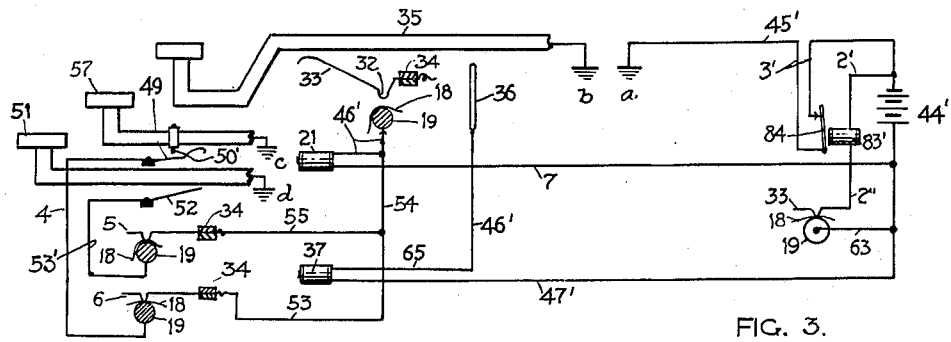
Fig. 3 is a diagrammatic view of the circuits showing a partial view of the keyboard and the electrical circuits and their switches.

The step-up electromagnet 21 is held fast to the bed plate by an angle a part of which is shown in Fig. 2, in section, of the support 24, and, when made whole, as in Fig. 1, continues around the electromagnet to support the armature 25. The outer end of the armature is provided with a fork 26, to loosely engage the rod 27, which is slidable in the cheeks 28 of the electromagnet. Surrounding the rod is the fixed block 29, which limits the backward movement of the rod when pressed by the spring 29' one end of which is attached to the rod while the other end is anchored to the frame of the typewriter, and also serves as the means for pivotally supporting the spring depressed pawl 29" engaging the fixed ratchet 30 on the extended shaft 31 of the metallic contact drum. With each step-up of the pawl and ratchet effect the perforated lesson sheet from the spool 17 advances one step forward, presenting, with each step, a newly positioned perforation in the sheet beneath a knee portion 32 of one of the resilient metallic strips 33 which are held fast in the two insulation bars 34 fixed to the two sides 16. Each one of the insulated metallic strips is so aligned below the typewriter keys 35, that whenever any one of the right keys is struck the insulated stop 36 is moved out of position by the rod 27, thus allowing the key bar to depress one of the knees 32 of the metallic strips, through one of the perforations in the sheet, in electrical contact with the metallic drum. In such a case no error occurs; therefore, the step-up electromagnet 21, in becoming energized, step-ups the perforated sheet for the next key action.

The circuit through the step-up electromagnet, where the right key is struck in synchronism with the perforation in the lesson sheet, may be followed from the negative side of the source 44' and to and from the armature 84, through conductor 3' to conductor 45', ground "a" and "b", thence to the keybar 35, metallic strip 33, knee 32, through perforation in the paper to metallic drum 19, brush and conductor 46', step-up electromagnet 21, and returning to the positive side of the source through conductor 7.

Should the wrong key be struck, however, the knee 32 depressed, will contact with the perforated lesson sheet 18, and, in failing to encounter one of the perforations in the sheet or to energize the step-up electromagnet, the keybar, will continue downward to rest directly upon the metallic strip 36, which as shown is rockably journalled through the insulation bushing 20' and is resiliently held in an upright position by the spring 36'. At the instant of contact between the keybar and stop a circuit is formed through the error recording electromagnet 37, which might be traced at this point—from the negative side of the source 44' to and from the armature 84, through conductor 3', conductor 45' to ground "a" to "b", keybar 35, metallic stop 36, conductors 46' and 65 to error-recording electromagnet 37, and back to the positive side of the source through conductor 47'. The error-recording electromagnet 37 is secured to a part of the frame of the typewriter, and through the same means the angle 38 is held fast and continues around the magnet to pivotally support the armature 39, resiliently held backward against the angle 40 by the spring 41. Referring to Fig. 2 and the enlarged view, Fig. 7, the top of the armature is shaped to a head 42, which freely contacts with the lower portion 43 of the handle 44, pivoted as at 45, the whole being hinged to the screen 46 in true alignment with the plunger 47, carrying an inked pad 48, slidably housed in the hub 49 of the screen and is resiliently pressed outwardly by the spring 50.

Figure 5:
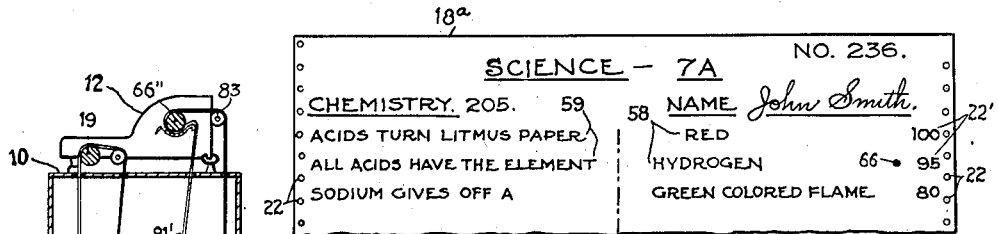
Fig. 5 is a partial face view of the printed lesson sheet showing one style or arrangement of "Questions" and "Answers", which may be printed on a single sheet of letter size.

The screen 46 partially surrounds the platen 66" and is designed to cover certain lines of the printed lesson sheet 18a, so as to conceal the answer from the pupil during the lesson time. When the pupil has forgotten an answer to a question he has only to pull the handle 44 downward when he will be able to read the answer and type it out in full upon the lesson sheet, as shown in Fig. 5, by the numeral 58. In identifying the answer, however, there will be a mark 66, Fig. 5, opposite the printed numbers 22' to indicate that the answer had been borrowed. This occurs when the handle of the screen is first moved downward manually, as in borrowing the answer, or electrically, when the error-recording magnet is energized when the inked pad is pressed against the lesson sheet through the inner motion of the lower portion 43 of the handle.

It will be noted that the energization of the step-up electromagnet 21, when the keys, including the shift key and space bar, are properly struck, as when in synchronism with the perforations of the perforated lesson sheet, or when the answers are true and properly written on the lesson sheet, the machine, in general is free to operate, that when any one of the keys is struck erroneously or when the misuse of the shift key and space bar is made, wherein their electrical contact portions do not synchronize with the perforated lesson sheet, the metallic strip 36 remains in an upright position to arrest further movement of the keys and, at the same time, to electrical contact therewith to form a circuit through the error-recording electromagnet to register the error made. The auxiliary brushes 49 and 52, electrically associated with the shift key 57, and space bar 51, show how the current may be carried to the insulation bar assembly, of contact makers, through the normally contacting brushes 5 and 6 of the group, and thereby become, electrically, subject to the perforations in the perforated lesson sheet, as in the case of the other contact makers or metallic strips 33, held fast by the insulation bars 34.

The shift key action, however, is intended to momentarily contact with its brush 49 during its downward stroke, the insulation strap surround the key bar carrying the depending tongue 50' pushes the end of the brush away from the bar just as the bar is about to come to rest downwardly, at the farthest end of the stroke.

This is for the purpose of enabling the operator to hold the shift key downward, non-electrical contacting, while striking a capital letter or one of the symbols, so as to continue the process of moving the perforation sheet with each stroke of the keys, the perforations in the paper being, successively, at all times one step ahead of the key pressed.

The electrical circuit involving the shift key and the insulated brush 49, where the right key is used, may be traced from the negative side of the source 44', conductors 3' to the armature 84, through conductor 45' to ground "a", and from ground "a" to ground "c", shift key bar 57 to brush 49, and leading therefrom through conductor 4, to the metallic contact drum 19, and from the brush 6, held by the insulation bars 34 to the conductors 53, 54 and 46' to the step-up electromagnet 21, and thence to the positive side of the source through conductor 7.

The space bar 51, when properly used, electrically contacts with the insulated brush 52 and closes the circuit leading from the source 44' to and from the armature 84 through conductors 3' to 45', ground "a" to ground "d", space bar 51, insulated brush 52, conductor 53', metallic contact roller 19, brush 5 secured to the bars 34, thence through conductors 55, 54 and 46' to the step-up electromagnet 21 and back to the source through conductor 7.

The armature 84, as a master switch for the various independent switches controlling the step-up electromagnet 21 and error-recording electromagnet 37, may serve when the electromagnet 83' is energized through the source 44' conductors 2', 2'', metallic strip 33, contact drum 19 and conductors 63 and 47', all of which serve to break the current from the source, to avoid action of the monitor during certain periods of the lesson when the typewriter, only, may be used. In this instance the contact between the drum 19 and the metal strip 33 is automatically permitted by special perforations in the perforated sheet or removal of the sheet when it is desired to permit operation of the typewriter without recording errors.

The shift key, together with the space bar, is monitored in the same manner by the perforated lesson sheet. The metallic stop 36 may be suitably positioned anywhere beneath the keys, other than as shown.

In order to prevent a pupil from turning the platen to a position in which the printed answers may be seen and turning the platen back and operating the typewriter keys to write the answer, there has been provided a lock and key 60 and 60' mounted on the bearing for the shaft 85 of the platen, and, having a bolt 61, the bottom of which is angled beneath the depressed pawl 62, will remain in mesh with the ratchet 66' fixed on the shaft of the platen, thus preventing a reverse motion of the platen, that, when unlocked, the bar and angle, through the locking means, will raise the pawl upward away from the teeth of the ratchet 66' and, in this way, prevent the platen to move in either direction.

Figure 4:
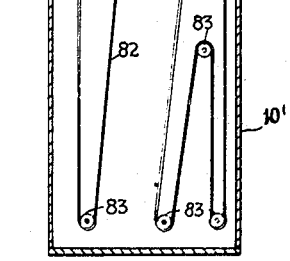
Fig. 4 is a modified form of the perforated lesson sheet associated with the metallic drum 19 and the printed lesson sheet associated with the platen 66", both sheets being in loop form.

Fig. 4 shows a modification of the perforated lesson sheet, designated as 81', and the printed lesson sheet as 82, as long endless sheets and in loop form, wherein many different kinds of lessons may be carried and made to come up in order of their sequence, coincidently with the movement of the typewriter and the monitor. The sheets are held in their proper position by the rollers 83 and are stepped-up in synchronism through the motion of the platen 66'' and the metallic drum 19 of the typewriter 12 shown on the table top 10. The case 10' shields the lesson sheets.

Figure 6:
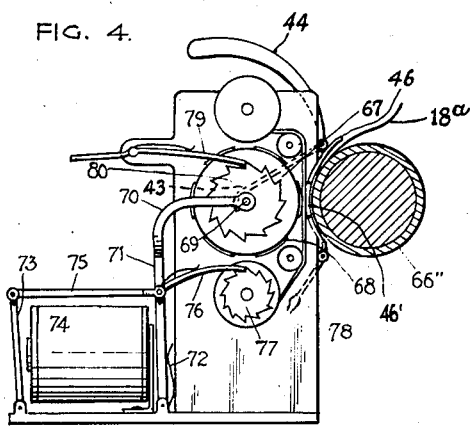
Fig. 6 is a modification in which the score of errors is accumulated and printed as they are made.
Figure 7:
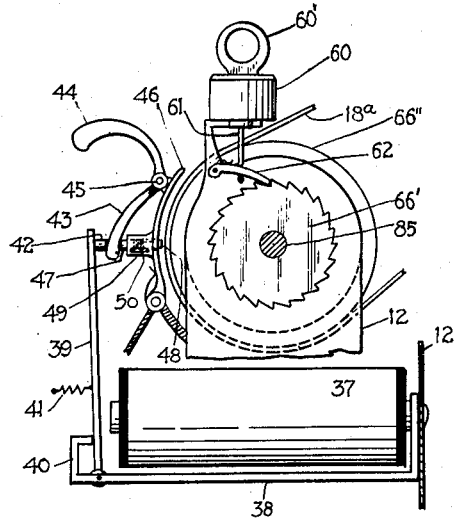
Fig. 7 is a fragmentary view illustrating an enlarged view of the screen, pawl and ratchet effect controlling rotation of the platen, together with means for scoring all errors made by the pupil on his printed lesson sheet.

Fig. 6 is a modified form of the marking process wherein the printing wheel 67 is shown carrying symbols 68, fixed on its shaft 69, supported by the forked end 70 of the pivoted arm 71 which is held backward by the spring 72. The armature 73 of the electromagnet 74 is loosely attached to the rod 75 which loosely connects with the arm 71, as does the spring depressed pawl 76 engaging the ratchet 77 of the spool, and when the electromagnet is engaged, the arm is attracted forward and after advancing the inked ribbon 78 prints the symbol aligned with the face of the sheet. The spring 72 returns the arm against the fixed spring detent 79 causing the printing wheel, through the fixed ratchet 80, to step-up one symbol before the arm comes to rest. In this way, all errors are printed in numerical form on the lesson sheet instead of designating the error by means of a printed dot. The numerals may start downward from the highest value to zero, or may be reversed. The shield 46 is practically the same as shown in Figs. 1, 2, and 7 except for the slot 46', which permits the type portion of the printing wheel to enter and strike the sheet and platen of the typewriter. The curved portion 43 of the handle 44 is made to partly surround the shaft 69 to manually operate the type wheel for marking the lesson sheet as in the case of the dot printing, which is otherwise accomplished through the action of the electromagnet 74.

Fig. 7 is an enlarged view of the lock assembly and the marking means showing a fragmentary view of the typewriter frame 12 for supporting the lock and pawl engaging the ratchet, also, the spring 50 bearing against the plunger 47, housed in the hub 49, upon the screen 46, as heretofore described.

In practice each pupil is provided with a table and typewriter, bearing a number, which may also identify the pupil and his lesson sheets. The regular letter size paper or the loop design, shown in Fig. 4, may be used in the typewriter. The appointed monitor in attendance has charge of the lesson sheets and otherwise is expected to keep order in the classroom.

The platen of the typewriter is free to move in both directions as now constructed, but in this particular case, when pushed forward beyond the printing line, it cannot reverse to bring the sheet of paper back to its old position except through the attending monitor's effort in turning the key of the lock.

The purpose of the lock and key is to prevent the pupil from cribbing the answer without being detected. The answers to the questions are available to the pupil at all times, he has only to pull the handle of the screen down, when the answers will become visible for him to copy.

Borrowing the answer, however, registers on his lesson sheet. Another one of the many features of the apparatus is to save time, especially so in long extended problems, as one example: multiply 249876×8079. Each step or line of the problem is transferred immediately from the pupil's pad to the keys of the typewriter. Should there be an error in the step, the apparatus will automatically lock at the point of the error, thus enabling him to correct his error before going to the second step, and so one to the end when he will be fresh of mind and encouraged to find that the machine tallies 100% for that particular problem.

The whole may work in connection with television and radio, or with other systems.

What I claim as new and desire to secure by Letters Patent of the United States is as follows:

1. In a device of the character described, the combination with a keyboard and a holder for a printed lesson sheet shiftably mounted and having a shield associated therewith and movable into and out of concealing relation to a portion of a sheet carried by the sheet holder; of means for controlling manipulation of keys of the keyboard including an electric circuit maker and breaker having a stationary contact and movable contacts individually movable towards the stationary contact when keys of the keyboard are depressed, insulating material movable across the stationary contact and having openings for exposing portions of the stationary contact under predetermined movable contacts as the insulating material is moved across the stationary contact, and means for imparting movement to the insulating material including an element energized when a movable contact engages the stationary contact; and means for recording movements of the shield out of shielding relation to the sheet holder including a marker movable into and out of marking engagement with the printed lesson sheet and controlled by movements of the shield relative to said sheet holder.

2. In a device of the character described, the combination with a keyboard and a holder for a printed lesson sheet shiftably mounted and having a shield associated therewith and movable into and out of position to conceal a portion of a sheet carried by the sheet holder, of means for controlling manipulation of keys of the keyboard including a circuit maker and breaker having movable contacts each adapted to be actuated by a companion key of the keyboard, suitably perforated insulating material movably mounted in cooperating relation to the movable contacts, and electrically energized actuating means for intermittently imparting movements to said insulating material in circuit with the circuit maker and breaker, and means for recording movements of the shield out of a shielding position including a marker movable into and out of position to engage and mark the printed lesson sheet, and electrically energized operating means for said marker having a switch in its circuit disposed in position to be closed by movement of the shield out of a shielding position.

3. In a device of the character described, a keyboard, a holder for a lesson sheet shiftably mounted, a shield movable into and out of a shielding position to cover a portion of a sheet carried by the sheet holder, means for controlling manipulation of keys of the keyboard including a circuit maker and breaker adapted to be actuated by depression of the keys, movably mounted suitably perforated insulating material for controlling closing of a circuit through the circuit maker and breaker, means for imparting movements to the insulating material including actuating means energized when a circuit is closed through the circuit maker and breaker, and means for recording movements of the shield out of a shielding position including a marker movable into and out of position to engage and mark the lesson sheet, and electrically energized actuating means for said marker having a circuit closer adapted to be closed by erroneous depression of a key of the keyboard.

4. In a device of the character described, a keyboard, a holder for a lesson sheet shiftably mounted, a shield movable into and out of a shielding position to cover a portion of a sheet carried by the sheet holder, means for controlling manipulation of keys of the keyboard including a circuit maker and breaker adapted to be closed by depression of the keys, movably mounted suitably perforated insulating material for controlling closing of a circuit through the circuit maker and breaker, and means for recording upon the lesson sheet movements of the shield out of a shielding position having electrically energized actuating means including a circuit closer switch adapted to be closed by erroneous depression of a key, and hand actuated means for operating the recording means.

5. In a device of the character described, a keyboard, a holder for a lesson sheet shiftably mounted, a shield movable into and out of position to shield a portion of a sheet carried by the sheet holder, means for controlling manipulation of keys of the keyboard including a circuit maker and breaker having a movably mounted sheet of suitably perforated insulation associated therewith, and means for recording upon the lesson sheet movements of the shield out of a shielding position adapted to be actuated during movement of the shield out of a shielding position.

6. In a device of the character described, a keyboard, a holder for a lesson sheet shiftably mounted, a shield movable into and out of position to shield a portion of a lesson sheet carried by the sheet holder, means for controlling manipulation of keys of the keyboard including a circuit maker and breaker having a movably mounted sheet of suitably perforated insulation associated therewith, and means for recording errors upon the lesson sheet including electrically energized actuating means having in its circuit a circuit closer mounted in position to be closed by an erroneously depressed key, the shield being provided with manually actuated means for moving the shield out of a shielding position and operating the recorder.

7. In a device of the character described, a keyboard, a holder for a lesson sheet shiftably mounted, a shield movable into and out of position to shield a portion of a sheet carried by the sheet holder, means for controlling manipulation of keys of the keyboard including a circuit maker and breaker having a movably mounted sheet of suitably perforated insulation associated therewith, and means for recording errors upon the lesson sheet, erroneous striking of keys and movements of the shield out of a shielding position including electrically energized actuating means having in its circuit a circuit closer mounted in position to be closed by an erroneously depressed key, and a handle for said shield pivoted thereto and having a portion depressed in position to actuate the recorder when the hand is moved in a direction to move the shield out of a shielded position relative to the lesson sheet.

8. In a device of the character described, a keyboard, a holder for a lesson sheet shiftably mounted, a shield movable into and out of position to shield a portion of a lesson sheet carried by the sheet holder, means for controlling manipulation of keys of the keyboard including a circuit maker and breaker having a stationary contact and movable contacts adapted to be actuated by movements of the keys, spools rotatably mounted, a strip of suitably perforated insulating material movable from one spool to the other and extending between the stationary contact and the movable contacts, and means for recording upon the lesson sheet erroneous striking of keys including a marking member slidable towards and away from the sheet holder, and electrically energized actuating means for said marking member having in its circuit a circuit closer adapted to be actuated by erroneously depressed keys.

9. In a device of the character described, a keyboard, a holder for a lesson sheet shiftably mounted, a shield movable into and out of position to shield a portion of a sheet carried by the sheet holder, means for controlling manipulation of keys of the keyboard including a circuit maker and breaker having a stationary contact and movable contacts adapted to be actuated by movements of the keys, spools rotatably mounted, a strip of suitably perforated insulating material movable from one spool to the other and extending between the stationary contact and the movable contacts, and means for recording upon the lesson sheet erroneous striking of the keys including an arm movable towards and away from said sheet holder, a marker carried by said shield for engaging and marking said lesson sheet when the arm is moved towards said sheet holder, an electromagnet, said arm constituting the armature of the magnet and being yieldably held away from the same, and a circuit closure in the circuit for the magnet adapted to be closed by erroneous depression of keys of the keyboard.

10. In a device of the character described, a circuit maker and breaker including a drum, a strip of suitably perforated insulating material for controlling closing of the circuit maker and breaker extending partially about the drum and between contacts of the circuit maker and breaker, a platen for carrying a lesson sheet, an arm movable towards and away from said platen, a marker positioned for operation by said arm, an electromagnet having said arm as its armature, a second electromagnet having said circuit maker and breaker in its circuit, means for imparting step-by-step movements to the drum actuated by the second electromagnet when the circuit maker and breaker is closed, and a circuit closer in the circuit of the first electromagnet movable out of an operative position by the second electromagnet when the second electromagnet is energized and adapted to be closed and energize the first electromagnet when closing of the circuit maker and breaker is prevented by the insulating material.

11. In a device of the character described, a circuit maker and breaker including a drum, a strip of suitably perforated insulating material extending partially about said drum, a platen, a marker movable towards and away from said platen for marking engagement with a portion of a lesson sheet carried by the platen, and means for controlling movements of said marker including a circuit closer adapted to be closed when closing of the first circuit maker and breaker is prevented.

12. In a device of the character described, a circuit maker and breaker including a drum, a strip of suitably perforated insulating material extending partially about said drum, a platen for carrying a lesson sheet, an arm movable towards and away from said platen, means actuated by said arm for marking said sheet when the arm is moved towards the platen, and an electromagnet for moving said arm towards said drum.

13. In a device of the character described, a platen for carrying a lesson sheet, an arm movable towards and away from said platen, a printing wheel carried by said arm, an electromagnet associated with the arm for moving the arm and the printing wheel towards the platen and the lesson sheet carried thereby when the magnet is energized, and an inking means cooperating with the printing wheel.

14. In a device of the character described, a platen for carrying a lesson sheet, an arm movable towards and away from said platen, a printing wheel carried by said arm, electrically energized actuating means for said arm for moving the arm and printing wheel towards the platen and the lesson sheet carried thereby, a ratchet at one side of said printing wheel, a latch engaging said ratchet for rotating the printing wheel in step-by-step movements as the arm and the printing wheel move away from the platen, and an inked ribbon movable between the printing wheel and a portion of the lessen sheet engaging said platen.

15. In a device of the character described, a keyboard, a stop extending under keys of the keyboard transversely thereof and movable from an upright operative position for blocking and limiting depression of the keys to a lowered position permitting full depression of the keys, electrically energized actuating means for said stop including a circuit maker and breaker having a stationary contact and movable contacts individually movable towards the stationary contact when companion keys are depressed and adapted to engage the stationary contact prior to engagement of the keys with the stop, a strip of insulating material movable between the stationary contact and the movable contacts and formed with openings for successively exposing portions of the stationary contact under predetermined movable contacts for establishing a circuit through the actuating means and moving the stop to its lowered position when keys companion to movable contacts over the openings are depressed and permitting full depression of the keys, a platen for carrying a lesson sheet, a marker for engaging and marking a lesson sheet carried by said platen when a key actuating a movable contact over an unperforated portion of the strip is erroneously depressed, and electrically energized actuating means for said marker having the stop and the keys in its circuit and constituting a switch having the stop as its stationary contact and the keys as its movable contacts.

16. In a device of the character described, a keyboard, a holder for holding a lesson sheet, a circuit maker and breaker including a stationary contact and movable contacts individually movable towards the stationary contact when companion keys are depressed, insulating material movable across the stationary contact and having perforations to expose portions of the stationary contact under predetermined movable contacts as it is moved, a stop movable into and out of position for limiting depression of the keys and constituting a contact, electrical means for moving said insulating material energized when a movable contact engages the stationary contact, a movable marker for engaging and marking a lesson sheet when a key is erroneously depressed, and electrical means for actuating said marker in circuit with the keys and the stop and being energized to operate the marker when the stop is engaged by a key is erroneously depressed and engages a movable contact over an unperforated portion of the insulating material.

17. In a device of the character described, the combination with a keyboard, of means for controlling manipulation of keys of the keyboard including a stop movable into and out of an operative position for limiting depression of the keys, actuating means for said stop including a circuit maker and breaker having a stationary contact and movable contacts movable towards the stationary contact when companion keys of the keyboard are depressed, insulating material movable across the stationary contact and having openings for exposing portions of the stationary contact under predetermined movable contacts as the insulating material is moved, means for imparting movements to the insulating material including an element energized when a movable contact engages the stationary contact, a platen for carrying a lesson sheet, a marker, and means for moving said marker into marking engagement with a lesson sheet having said stop and said keys in its circuit and constituting a switch for closing the circuit when a key associated with a movable contact over an unperforated portion of the insulating material is erroneously depressed and the key moved into engagement with the stop.

18. In a device of the character described, the combination with a keyboard, of means for controlling manipulation of keys of the keyboard including a stop movable into and out of an operative position for limiting depression of the keys, actuating means for said stop including a circuit maker and breaker having a stationary contact and movable contacts individually movable towards the stationary contact when companion keys of the keyboard are depressed, insulating material movable across the stationary contact and having openings for exposing portions of the stationary contact under predetermined movable contact as the insulating material is moved, means for imparting movements to the insulating material including an element energized when a movable contact engages the stationary contact, a platen for carrying a lesson sheet, a marker, and means for moving said marker into marking engagement with a lesson sheet including an electromagnet in circuit with the keys and said stop and adapted to be energized when a key associated with a movable contact insulated from the stationary contact is erroneously depressed and engages the stop after depressing the companion movable contact.

19. In a device of the character described, a keyboard, a holder for a lesson sheet shiftably mounted, a stop for controlling manipulation of keys of the keyboard movable into and out of an operative position and having actuating means including a circuit maker and breaker adapted to be closed by depression of the keys, movably mounted suitably perforated insulating material cooperating with the keys for controlling closing of a circuit through the circuit maker and breaker, and means for recording upon the lesson sheet erroneous depressing of the keys having electrically energized actuating means in circuit with the keys and said stop and energized when a key is erroneously depressed and makes contact with the stop.

20. In a device of the character described, a keyboard, a holder for a lesson sheet shiftably mounted, a shield movable into and out of a shielding position to cover a portion of a lesson sheet carried by the sheet holder, a stop movable into and out of position for controlling manipulation of keys of the keyboard having operating means including a circuit maker and breaker adapted to be closed by depression of the keys, movably mounted suitably perforated insulating material for controlling closing of a circuit through the circuit maker and breaker, means for recording upon the lesson sheet erroneous depressing of the keys and also movements of the shield out of a shielding position, electrically energized operating means for the last mentioned means having in its circuit a switch consisting of the stop and the keys, and manually actuated means for the recording means constituting means for shifting the position of the shield.

21. In a device of the character described a shiftable set of multiple faced type bars, a companion set of operating keys, and a shift key, in combination with each operating key and the shift, contact means having a suitably perforated strip of insulating material movable by electro-mechanical step-up means between contacts of the contact means, a source of electric energy and circuit means therefor including the contact means for operating the step-up means when the proper key is pressed.

22. In a device of the character described a shiftable set of multiple faced type bars a companion set of operating keys and a shift key, in combination with each operating key, a first contact means including a contact movable thereby and a fixed contact, second contact means for the shift key including said fixed contact, a strip of suitably perforated insulation material movable by electro-mechanical step-up means between said fixed contact and its associated contacts, a source of electric energy and circuit means therefor including said first contact means, a second circuit means including a switch operable by said shift key, both said circuit means for energizing said step-up means when the proper key is pressed.

23. In a device of the character described, a platen, a carriage for said platen, a set of shiftable type bars, a companion set of operating keys, a shift key and spacer key, in combination therewith a fixed contact member, a movable contact member associated with each operating key, other contact members for the shift key and the spacer key and a suitably perforated insulation sheet movable by electro-mechanical step-up means between the fixed contact member and said other contact members, a source of electric supply and a first circuit means therefor including the fixed contact member and the movable contact member, second and third circuit means for said source, each including said fixed contact member, one each of said other contact members and one each of two switch members operable by said shift key and said spacer key respectively, all of said circuits being arranged to energize said electro-mechanical step-up means when the proper key is pressed.

24. In a device of the character described a set of operating keys, in combination therewith first and second contact means having a suitably perforated strip of insulating material movable by electro-mechanical step-up means between the contacts of the contact means, an electric energy source, a normally closed relay, a first circuit for operating said step-up means including said first contact means, said relay and said source when the proper key is pressed; and a second circuit for opening said relay, including said source and said second contact means.

JOHN P. BUCKLEY.